US010537815B2

(12) United States Patent
Ur

(10) Patent No.: US 10,537,815 B2
(45) Date of Patent: Jan. 21, 2020

(54) SYSTEM AND METHOD FOR SOCIAL DANCING

(71) Applicant: Shmuel Ur, D.N. Misgav (IL)

(72) Inventor: Shmuel Ur, D.N. Misgav (IL)

( * ) Notice: Subject to any disclaimer, the term of this patent is extended or adjusted under 35 U.S.C. 154(b) by 861 days.

(21) Appl. No.: 14/415,133

(22) PCT Filed: Jul. 7, 2013

(86) PCT No.: PCT/IL2013/050579
§ 371 (c)(1),
(2) Date: Jan. 15, 2015

(87) PCT Pub. No.: WO2014/013483
PCT Pub. Date: Jan. 23, 2014

(65) Prior Publication Data
US 2016/0199741 A1   Jul. 14, 2016

Related U.S. Application Data

(63) Continuation of application No. 13/550,019, filed on Jul. 16, 2012, now Pat. No. 8,779,908.

(51) Int. Cl.
*A63F 13/847*  (2014.01)
*A63F 13/30*  (2014.01)
(Continued)

(52) U.S. Cl.
CPC ............ *A63F 13/847* (2014.09); *A63F 13/10* (2013.01); *A63F 13/12* (2013.01); *A63F 13/30* (2014.09);
(Continued)

(58) Field of Classification Search
CPC ...... A63F 13/30; A63F 13/847; A63F 13/816; A63F 13/10; A63F 13/12; A63F 2300/8047
See application file for complete search history.

(56) References Cited

U.S. PATENT DOCUMENTS

| 4,988,981 A * | 1/1991 | Zimmerman | ......... A61B 5/1114 |
| | | | 345/156 |
| 5,185,561 A * | 2/1993 | Good | ..................... G06F 3/014 |
| | | | 318/432 |

(Continued)

FOREIGN PATENT DOCUMENTS

WO    2010084490 A1    7/2010

OTHER PUBLICATIONS

Deepa Mathew, Wearable Haptics, Oct. 2008 (Available at: http://www.cs.uta.fi/hui/mobile/slides/Mathew.pdf).
(Continued)

*Primary Examiner* — David L Lewis
*Assistant Examiner* — Matthew D Hoel
(74) *Attorney, Agent, or Firm* — Myers Wolin, LLC

(57) ABSTRACT

A system and method for enabling social dancing. The system comprising a movement registration module configured to monitor and identify movements by a participant; and a tactile feedback actuator configured to supply tactile feedback to the participant based on a determination by a logic module. The method performed by a computerized device, the method comprising: monitoring movements by a participant; determining feedback in response to the movements; and instructing a tactile feedback actuator to supply the feedback to the participant.

19 Claims, 6 Drawing Sheets

(51) Int. Cl.
*A63F 13/816* (2014.01)
*A63F 13/40* (2014.01)

(52) U.S. Cl.
CPC .... *A63F 13/816* (2014.09); *A63F 2300/8047* (2013.01)

(56) References Cited

U.S. PATENT DOCUMENTS

| | | | | |
|---|---|---|---|---|
| 5,577,981 A * | 11/1996 | Jarvik | A63B 21/154 | 434/247 |
| 5,739,811 A * | 4/1998 | Rosenberg | A63F 13/06 | 345/161 |
| 5,767,839 A * | 6/1998 | Rosenberg | A63F 13/06 | 345/156 |
| 5,913,727 A * | 6/1999 | Ahdoot | A63F 13/06 | 463/39 |
| 6,227,974 B1 * | 5/2001 | Eilat | A63F 13/005 | 273/148 B |
| 6,628,265 B2 * | 9/2003 | Hwang | G10H 1/00 | 250/221 |
| 7,225,404 B1 * | 5/2007 | Zilles | G06F 3/011 | 715/701 |
| 7,646,372 B2 * | 1/2010 | Marks | A63F 13/00 | 345/156 |
| 7,714,836 B2 * | 5/2010 | Rodomista | G06F 3/016 | 345/156 |
| 7,850,526 B2 * | 12/2010 | Zalewski | G06F 3/017 | 463/36 |
| 8,427,325 B2 * | 4/2013 | Ferguson | A61B 5/1126 | 340/12.22 |
| 8,562,403 B2 * | 10/2013 | Boch | A63F 13/428 | 463/7 |
| 8,577,085 B2 * | 11/2013 | Geiss | G06T 7/251 | 382/103 |
| 8,578,302 B2 * | 11/2013 | Markovic | H04N 7/18 | 345/156 |
| 8,878,949 B2 * | 11/2014 | Pryor | G06F 3/017 | 348/211.4 |
| 2001/0020937 A1 * | 9/2001 | Rosenberg | G01B 5/008 | 345/184 |
| 2002/0021283 A1 * | 2/2002 | Rosenberg | A63F 13/10 | 345/156 |
| 2007/0021199 A1 * | 1/2007 | Ahdoot | A63B 24/0003 | 463/30 |
| 2007/0063849 A1 * | 3/2007 | Rosella | A41D 1/002 | 340/573.1 |
| 2008/0120029 A1 * | 5/2008 | Zelek | G01C 21/20 | 701/469 |
| 2008/0146302 A1 * | 6/2008 | Olsen | A63F 13/213 | 463/7 |
| 2010/0173276 A1 * | 7/2010 | Vasin | A63B 24/0006 | 434/307 R |
| 2011/0270135 A1 * | 11/2011 | Dooley | G16H 50/30 | 600/595 |
| 2012/0319989 A1 * | 12/2012 | Argiro | G06F 3/038 | 345/174 |
| 2013/0072301 A1 * | 3/2013 | Mallinson | A63F 13/06 | 463/36 |

OTHER PUBLICATIONS

CyberForce, Verlogic (Available at: http://www.vrlogic.com/html/immersion/cyberforce.html).
Immersence: Virtual reality you can reach out and touch, Jul. 2010 (Available at: http://ispr.info/2010/07/02/immersence-virtual-reality-you-can-reach-out-and-touch/).
Haptics, immersence, beaming and the Allosphere, Jun. 2010 (Available at: http://www.computescotland.com/haptics-immersence-beaming-and-the-allosphere-3452.php).
Holldampf J. Synthesis of an interactive haptic dancing partner, RO-MAN, 2010 IEEE.

* cited by examiner

SYSTEM AND METHOD FOR SOCIAL DANCING

CROSS-REFERENCE TO RELATED APPLICATION

This is an application for a United States utility patent and is being filed as a national application in the United States Patent Office under 35 U.S.C. 371 and claims the benefit of U.S. Non-Provisional application Ser. No. 13/550,019, now U.S. Pat. No. 8,779,908 filed Jul. 16, 2012, entitled "SYSTEM AND METHOD FOR SOCIAL DANCING", by being a national stage filing of International Application Number PCT/IL2013/050579 filed on Jul. 7, 2013, each of which are hereby incorporated by reference in their entirety.

TECHNICAL FIELD

The present disclosure relates to dancing in general, and to system and method for social dancing, in particular.

BACKGROUND

Dance games are a popular class of electronic games. However, the currently available dance games do not relate to the activity of social dancing, in which two or more partners dance with each other.

The currently available games provide the participants visual and auditory cues, thereby allowing the participants to interact with the game system. Each cue may signal the participant to perform a certain movement or subroutine, thereby instructing the participant to perform a predetermined dance routine.

BRIEF SUMMARY

One exemplary embodiment of the disclosed subject matter is a system comprising: a movement registration module configured to monitor and identify movements by a participant; and a tactile feedback actuator configured to supply tactile feedback to the participant based on a determination by a logic module.

Another exemplary embodiment of the disclosed subject matter is a computer-implemented method performed by a computerized device, the method comprising: monitoring movements by a participant; determining feedback in response to the movements; and instructing a tactile feedback actuator to supply the feedback to the participant.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
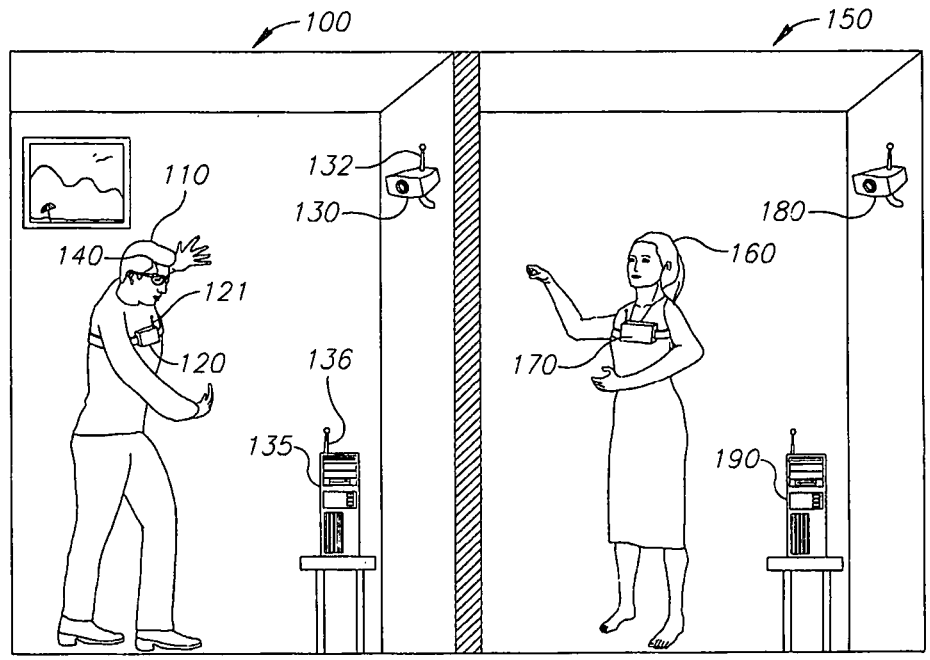
FIG. 1A-1F shows a schematic illustration of a computerized environment, in accordance with some embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is providing a human participant to participate in a social dance without having a partner in the same physical location. In some exemplary embodiments, two people at remote locations would like to dance with each other. Additionally or alternatively, a person would like to perform social dancing activity with a virtual partner.

Social dance activity is based on tactile feedback between the participants, and in many cases is indifferent to visual and auditory cues from the dance partners. Social dancers, depending on the dance, usually make contact hand-to-hand, chest-to-chest, and hand-to-back during the dance routine. Some dancers may even close their eyes when performing a social dance, and focus on the non-visual cues that their dance partner provides.

Another technical problem is to enable plurality of users to participate in a virtual party, such as a ballroom dance.

Yet another technical problem is to allow users to perform any co-operative physical activity, such as but not limited to a martial art exercise, social dance routine, or the like, without being located in the same physical location.

One technical solution provided by the disclosed subject matter is a system comprising movement registration module used to interpret the movements of the participant and a tactile feedback actuator that is configured to provide tactile feedback to the participant. As social dance is based on tactile feedback, merely being able to see a representation of one's partner is inadequate—a way to 'feel' them is preferable. The tactile feedback may provide such feedback that simulates the feedback of a dancing partner.

The tactile feedback may be provided based on a response of a dance partner to the participant's movements or dance routines. For clarity, the disclosed subject matter refers to the participant as a male while the dance partner is referred to as a female. However, the disclosed subject matter is not limited in such a way. Furthermore, the disclosed subject matter may be used for social dance routines involving more than two participants, such as square dance, Rueda, or the like.

In some exemplary embodiments, the dance partner may be a virtual dance partner whose actions may be determined by a computer. In some exemplary embodiments, a dancing logic module may calculate the movements of a simulated partner of given skill and style and simulates the tactile feedback accordingly. Additionally or alternatively, the dance partner may be a real dance partner that is in a remote location. The remote dancing partner may act in response to the participant's movements and based upon her responses, tactile feedback may be provided to the participant, such as reflecting the dance partner's movements. In some exemplary embodiments, the tactile feedback may represent the movement of the partner.

In some exemplary embodiments, the participant may be provided with visual and/or audio-based feedback. In some exemplary embodiments, visual feedback may include a graphical display of the dance partner. In some exemplary embodiments, the dance partner may be filmed in real-time and his or her image may be provided. In some exemplary embodiments, an avatar, such as a 3D avatar of the partner may be displayed. In some exemplary embodiments, such as in case the partner is virtual, the avatar may be generated based on computations by the dancing logic module. In some exemplary embodiments, the avatar may be structured based upon the body structure of the partner.

In some exemplary embodiments, the graphical display may further include the participant himself. The image of the participant can be real, such as captured by camera. Additionally or alternatively, the image may be enhanced to look as either dancer pleases.

In some exemplary embodiments, the graphical display may be provided using a display such as a television screen or projector. Additionally or alternatively, the graphical display may be provided in an Augmented Reality (AR) manner, such as Augmented Reality glasses. Augmented Reality devices may be used to increase the participant's feeling that he is dancing with a dance partner, such as by displaying in augmented reality the dance partner in his arms.

In some exemplary embodiments, a dance party with many people (e.g. a ballroom) can be simulated. In some exemplary embodiments, on every participant's side augmented reality devices which simulates the party room may be used. In some exemplary embodiments, anybody could be invited to join the dance party, so as to provide for a virtual dance party based on actual human interaction. In some exemplary embodiments, a simulated ballroom may be computed in which some dancers are humans and some are AI-based.

In some exemplary embodiments, a social dance between two real partners may be presented as part of a larger party that includes virtual dancers. Though only two people are dancing the disclosed subject matter may making it feel like both dancers are part of a larger party.

In some exemplary embodiments, a participant may switch a dance partner from time to time. In some exemplary embodiments, the participant may switch between real and virtual partners.

In some exemplary embodiments, the movement registration module may include a motion sensing input device. The motion sensing input device may be, for example, a remote sensor, such as a video camera, a Kinect™-like system which is based on remotely sensing user movement using radar, sound or the like. Additionally or alternatively, the motion sensing input device may be a body-worn device, such as a glove or body-worn outfit that is capable of sensing, such as using accelerometer, optical sensor, depth sensors, and other electronic means known in the art to sense movement of a person wearing the device. It will be noted that in the present disclosure "body-worn" may refer to an item that is worn by a participant, held or carried by him, or otherwise coupled to the body of the participant.

In some exemplary embodiments, the same body-worn device used for motion sensing may include the tactile feedback actuator.

In some exemplary embodiments, the tactile feedback actuator may be located on the participant's body so as to supply tactile feedback on the participant's hand, chest, back, hips, or the like.

In some exemplary embodiments, a body-worn device may be limited, in comparison to external devices, as it may be required to give the feeling of outside force a mobile device but it may not actually apply outside force. In some exemplary embodiments, an external device may limit the movements of the participant and therefore it may be desired to avoid the use thereof.

In some exemplary embodiments, the disclosed subject matter may be configured to identify movements and reflect those movements on a dance partner. In some exemplary embodiments, precision of reflection may be desired, such as to allow professional dancers or martial art experts to improve their performance and detect subtle differences. In some exemplary embodiments, it may not be sufficient to simply interpret a gesture to comprehend the participant's intent, but rather it may be desirable to reflect the movements as is and allow the dance partner interpret the underlying intent on her own.

One technical effect may be enabling a participant to interact with an electronic system by performing social dancing. Another technical effect may be allowing the participant to interact with the system without relying on his sense of sight (e.g., with his eyes closed). Yet another technical effect may be to increase range of social interactions with remote users to include social dancing activities.

Referring now to FIG. 1A showing an illustration of a computerized environment, in accordance with some embodiments of the disclosed subject matter.

A Participant 110, located in a Location 100, may perform social dancing activity using a computerized system in accordance with the disclosed subject matter. A Motion Sensing Input Device 130 may capture movements of Participant 110. It will be noted that in some exemplary embodiments Motion Sensing Input Device 130 may be a remote sensor, such as video camera, as is exemplified in FIG. 1A. Additionally or alternatively, other forms of remote sensors, such as using infrared projectors, camera, microphone array, depth sensors, or additional sensors. One example of such remote sensor is commercially available in Microsoft Kinect™. Additionally or alternatively, Motion Sensing Input Device 130 may be a body-worn device or any other device capable of detecting motion of Participant 110. In some exemplary embodiments, Motion Sensing input Device 130 may be incorporated with a Tactile Feedback Actuator 120 which is body-worn.

In some exemplary embodiments, Motion Sensing Input Device 130 may transmit, either wirelessly (e.g., using wireless transmitter 132) or wired manner detected motions to a Computer 135 (e.g., using wireless transceiver 136). Computer 135 may comprise a processor (not shown) and memory (not shown). Computer 135 may include a movement registration module (not shown) that is configured to receive movement information detected by Motion Sensing Input Device 130, interpret those movement to determine how to reflect them on a dance partner. In some exemplary embodiments, movement registration module may receive a video feed from a Motion Sensing Input Device 130 (i.e., in an embodiment using a video camera) and interpret the video and motions performed by Participant 110 as appearing in the video.

In response to the actions of Participant 110 Computer 135 may determine a response by the dance partner. A Tactile Feedback Actuator 120 may receive commands from Computer 135 (e.g., via transceiver 122) and may supply tactile feedback to participant simulating response by the dance partner.

In some exemplary embodiments, the simulated dance partner may be a virtual dance partner whose actions are determined based on calculations of Computer 135. Additionally or alternatively, the simulated dance partner may be based on a Dance Partner 160 located in Remote Location 150. In some exemplary embodiments, Dance Partner 160 may use similar system, such as including a Computer 190, a Tactile Feedback Actuator 170 and a Motion Sensing Input Device 180 to allow Dance Partner 160 to interact with a computerized system. Based on motions performed by Participant 110, feedback may be provided to Dance Partner 160, who may perform a response, effect thereof may be simulated as a tactile feedback that is supplied to Participant 110.

In some exemplary embodiments, Computer 135 and Computer 190 may be connected to each other via a computerized network, such as a WAN, a LAN, a Wi-Fi network, an intranet, the Internet, or the like. Computers 135 190 may transfer information therebetween to allow each system to simulate movement of the other participant.

In some exemplary embodiments, Computer 190 may provide video capture of Dance Partner 160 to be used in a graphical display provided as a visual feedback to Participant 110. In some exemplary embodiments, Participant 110 may wear Augmented Reality (AR) Glasses 140 which provides the graphical display. AR Glasses 140 may comprise a see-through screen which is capable displaying layered information over the view. The graphical display may be determined in a manner that displays the Dance Partner 160 in proximity to Participant 110 as if located beside him while dancing. Additionally or alternatively, the graphical display may be displayed on a display or screen (not shown).

Figure 1B:
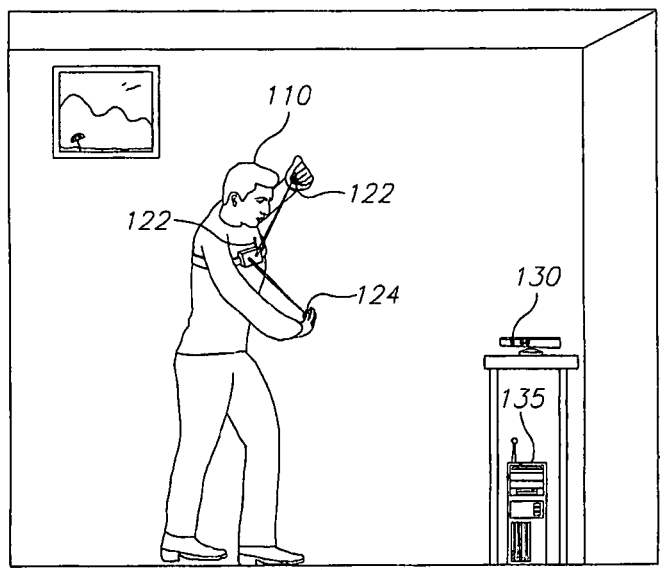

Referring now to FIG. 1B showing an illustration of a computerized environment, in accordance with some embodiments of the disclosed subject matter.

Tactile Feedback Actuator 120 may further be connected to Support 122, Support 124, or the like. Support 122 may provide a resting point for Participant's hand. In some exemplary embodiments, Support 122 may comprise of a rod having a resting point in a leading end thereof. In some exemplary embodiments, Supports 122, 124 may be adjusted to match Participant's characteristics, such as by extending a telescopic rod, by adjusting the direction of the rod, or the like. The location of the resting point may be adjusted to match a location of the hand of Participant 110 when dancing with a dance partner. In some exemplary embodiments, the location of the resting point may be adjusted to patch Participant's dance frame.

In some exemplary embodiments, Support 122 may be responsive to force applied to it, such as a force of Participant's hand pushing or pulling the resting point while performing a dance routine. Sensors in Support 122 may detect application of such force, and may be utilized in addition to or instead of Motion Sensing Input Device 130 capable of remotely sensing Participant's 110 motion.

In some exemplary embodiments, Support 122 and 124 may or may not be joint at their base. In some exemplary embodiments, Support 122 and Support 124 may be constructed from flexible material allowing them to bend if their rods cross each other, such as when performing Referring now to FIG. 1C-E showing illustrations of a computerized environment, in accordance with some embodiments of the disclosed subject matter.

Figure 1C:
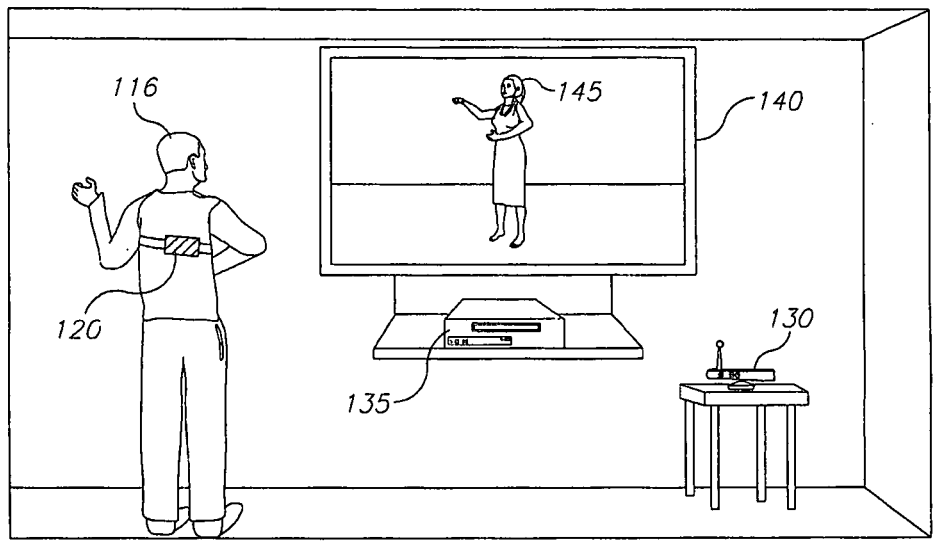

In FIG. 1C, Participant 110 is shown to be looking at Display 140 providing a graphical display of Dance Partner 160. Image 145 may be video capture of Dance Partner 160 by a video camera located in front of Dance Partner 160 in Remote Location 150. Additionally or alternatively, Image 145 may be Computer-Generated Image (CGI) based on a profile of Dance Partner 160 or based on a dance partner profile in case of a virtual dance partner.

Display 140 may provide a graphical display similar to a display provided by AR Glasses 140.

Figure 1D:
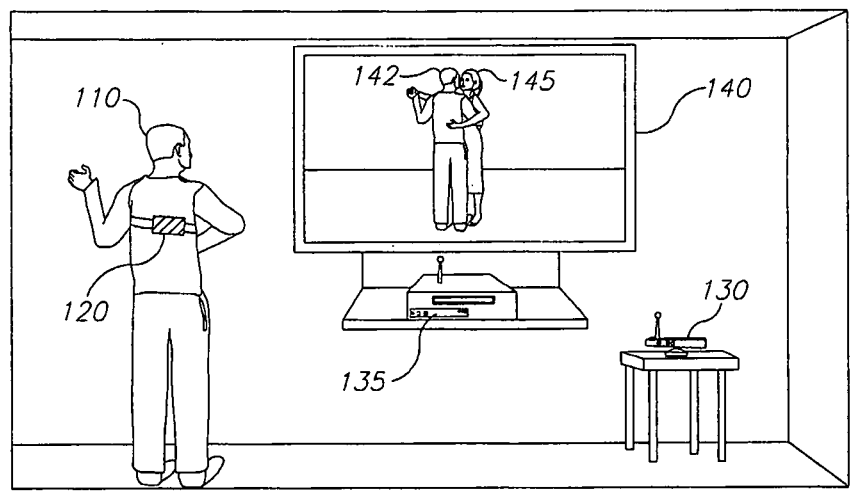
Figure 1E:
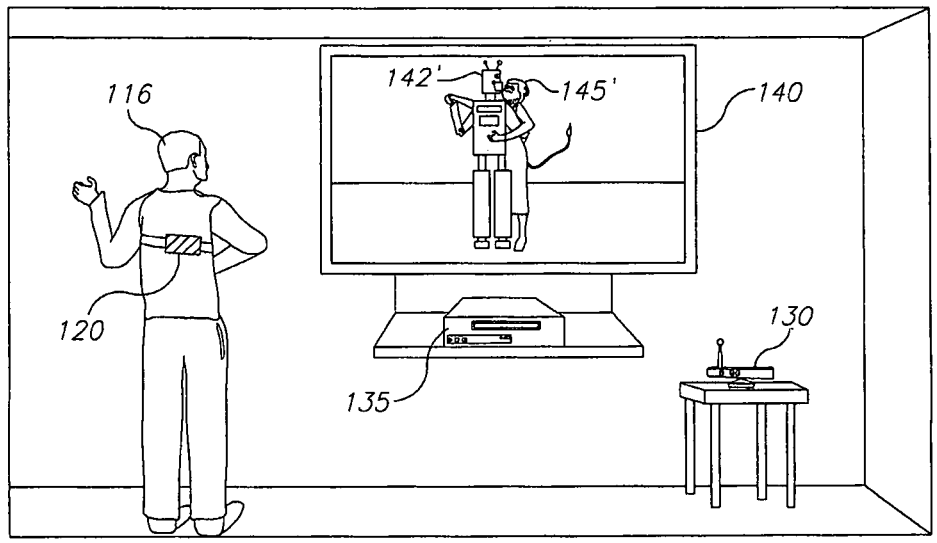

In FIG. 1D, Display 140 shows both image of the partner 145 and image 142 representing the Participant 110. Participant's image may be video captured by a video camera located substantially behind Participant 110.

In some exemplary embodiments, a first video camera may be located substantially behind Participant 110 in order to capture an image of the back side of so Participant 110. A second video camera may be located substantially in front of Participant 110 in order to capture an image of his front side. The back side image may be used by Display 140, while the front side may be used by a corresponding display used in Remote Location 150 to provide a graphical display to Dance Partner 160.

In some exemplary embodiments, Motion Sensing Input Device 130 may comprise the second video camera and/or the first video camera.

FIG. 1E exemplifies that Image 142' and/or Image 145' may be Computer Generated avatars, which may be generated and rendered based on the participants' physical characteristics, movements, or the like. In some exemplary embodiments, the avatar may be of higher or shorter height than the person. In some exemplary embodiments, the avatar's limbs may or may not be proportionate to the size of the person's limbs. In some exemplary embodiments, the avatar may or may not be a humanoid avatar. In some exemplary embodiments, each user, such as Participant 110, may define his own avatar, and may modify its characteristics such as skin color, eye color, hair, nose, mouth, facial hair, cloths, texture, or the like.

Figure 1F:
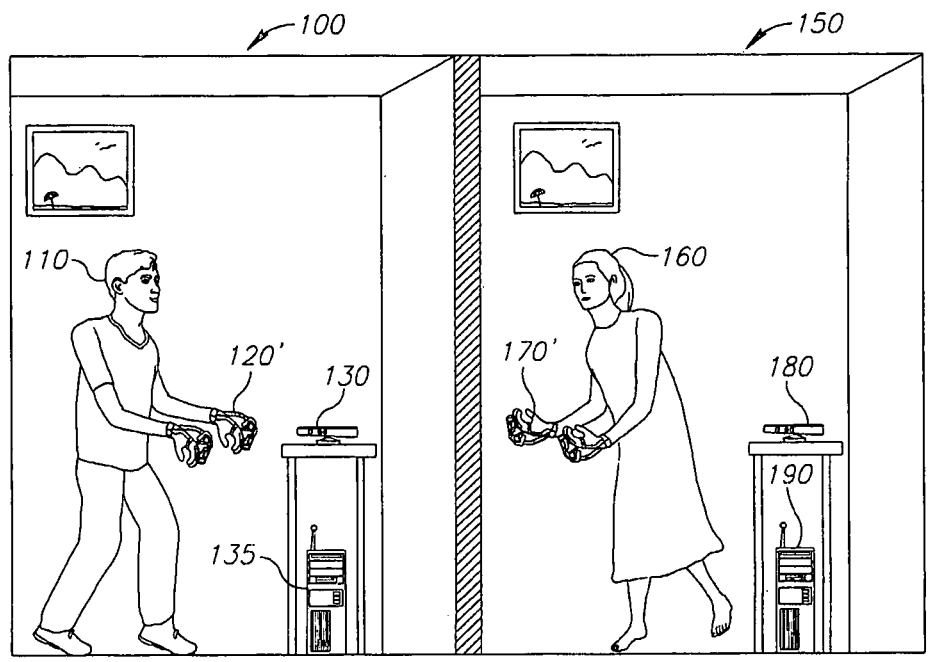

Referring now to FIG. 1F showing illustrations of a computerized environment, in accordance with some embodiments of the disclosed subject matter.

Tactile Feedback Actuator 120', 170' may be body-worn gloves capable of supplying tactile feedback to a user's hand. The body-worn gloves, such as disclosed in www.vr-logic.com/html/immersion/cybergrasp.html and in www.vr-logic.com/html/immersion/cyberforce.html, both are hereby incorporated by reference. Tactile Feedback Actuator 120' may comprise a lever for applying seemingly external force on the hand of the user, such as reflecting a dance partner's movements in social dances that involve hand-to-hand contact.

Figure 2:
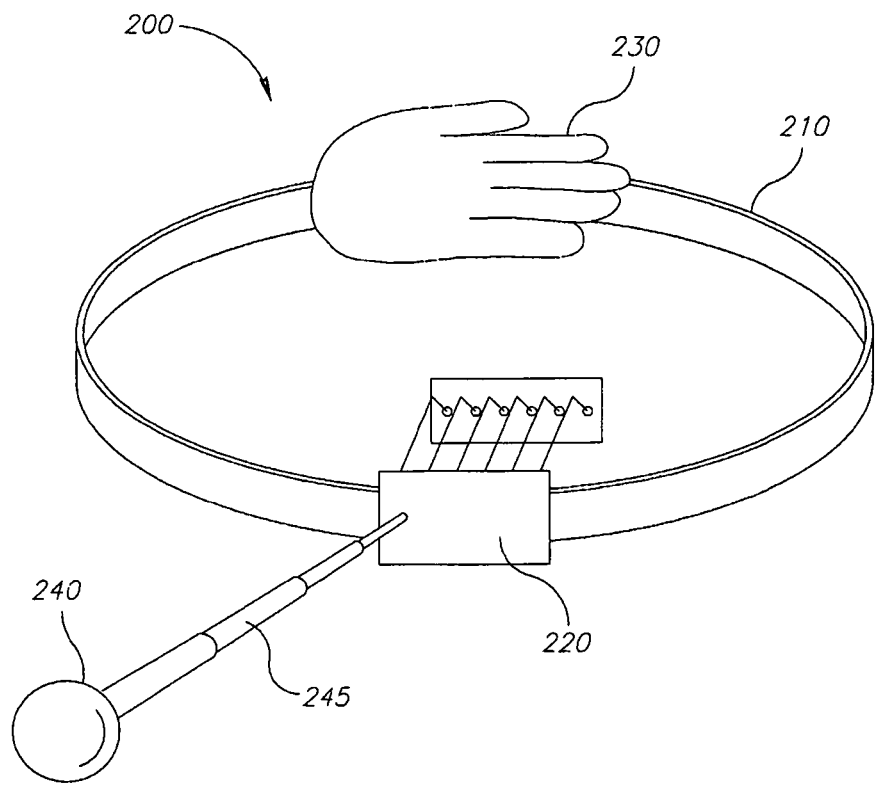
FIG. 2 shows a schematic illustration of a body-worn device, in accordance with some exemplary embodiments of the disclosed subject matter.

Referring now to FIG. 2 shows a schematic illustration of a body-worn device, in accordance with some exemplary embodiments of the disclosed subject matter Device 200 may function as Tactile Feedback Actuator 120 and/or a body-worn Motion Sensing Input Device. Device 200 may comprise Belt 210 to be worn by a user around his waist, torso, or the like.

Chest Tactile Supplier 220 may be comprised of a moveable plate which may be moved by one or more extendable levers. Chest Tactile Supplier 220 may be positioned on or about the user's chest. The plate may be extended towards the chest, thereby supplying tactile feedback to the user's chest of a chest-to-chest contact.

Back Tactile Supplier 230 may be shaped as a human hand and may be positioned substantially in parallel to Chest Tactile Suppler 220. Back Tactile Supplier 230 may be positioned on or about the user's back. Back Tactile Supplier 230 may be configured to press against the user's back, thereby providing tactile feedback of a hand-to-back contact.

In some exemplary embodiments, Device 200 may comprise Support 240, such as 122 of FIG. 1B. Support 240 may be positioned in a leading end of rod 245, which may or may not be extendable. Support 240 may be positioned in a distance and direction from Belt 210 corresponding to a user's hand resting point behind a dance partner's back. In some exemplary embodiments, Support 240 may comprise sensors capable of sensing a force applied by user's hand. In some exemplary embodiments, by applied sufficient force on Support 240 above a predetermined threshold, rod 245 may be moved, such as by changing the angle between Belt 210 and Support 240. In some exemplary embodiments, any detection of user's movement may be transmitted using wireless transmitters (not shown) to a dancing logic module (not shown), which may determine response by a dance partner. In some exemplary embodiments, the response may be determined based on AI computation of a virtual partner. Additionally or alternatively, the response may be determined by simulating the user's movement to a real dance partner (e.g. Dance Partner 160) and capturing her responses.

In some exemplary embodiments, pressure applied by a user on Support 240 may be simulated as a pressure on a corresponding device worn by the remote dance partner supplied by Back Tactile Supplier 230.

Figure 3A:
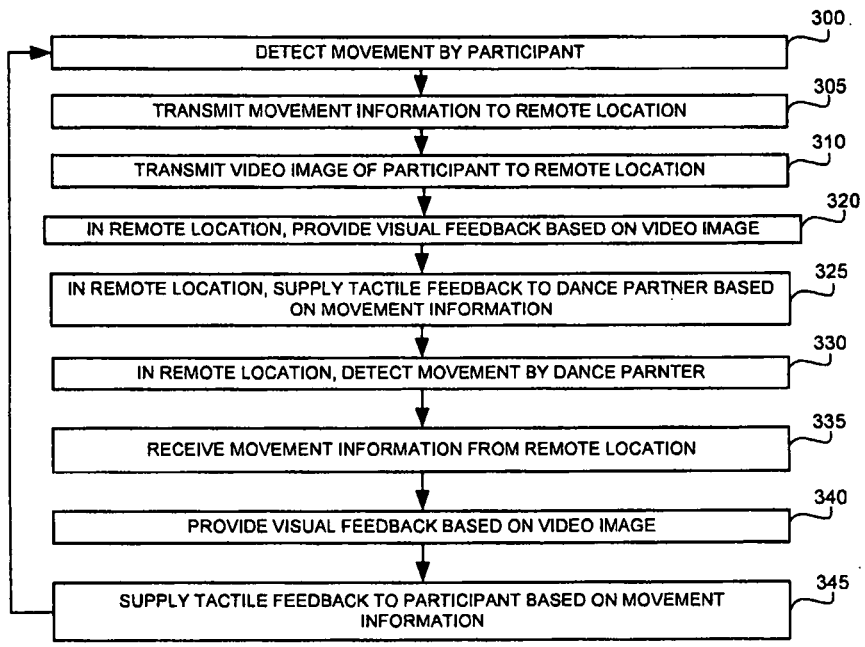
FIG. 3A shows a flowchart of steps in a method for performing a social dance with a remote partner, in accordance with some exemplary embodiments of the disclosed subject matter.

Referring now to FIG. 3A showing a flowchart of steps in a method for performing a social dance with a remote partner, in accordance with some exemplary embodiments of the disclosed subject matter.

In Step 300, movement of the participant may be detected. Detection may be performed using any motion sensing input device, such as but not limited to remote motion sensing input device, body-worn motion sensing input device, or the like. In some exemplary embodiments, a movement registration module may be operatively coupled to the motion sensing input device and configured to analyze sensory information detected by the motion sensing input device. The movement registration module, which may be implemented in software, hardware, combination thereof, or the like, may be configured to analyze the sensory information and identify movements by the participant, such as representing dance related gestures.

In Step 305, movement information may be transmitted to a remote location, such as by a computing platform (e.g., 135 of FIG. 1A). In some exemplary embodiments, information may be transmitted to remote location via a computerized network.

In Step 310, video image, of participant, such as captures by a video camera, which may or may not be a part of a remote motion sensing input device, may be transmitted to a remote location.

Steps 320-330 may be performed in the remote location.

In Step 320, visual feedback may be provided to dance partner such as using AR devices, a display, or a similar device. The visual feedback may be the video image or based thereon. The visual feedback may or may not include virtual avatars representing the dance partner and/or the participant.

In Step 325, tactile feedback may be supplied to the dance partner, such as by a tactile feedback actuator, which may or may not be body-worn (e.g., 120 of FIG. 1A). The tactile feedback may be devised to simulate contact between participant and dance partner. The tactile feedback may be based on movement of the participant and simulate the effect of such movement on the dance partner.

In Step 330, movement by the dance partner may be detected. Step 330 may be similar to Step 300.

Information gathered in remote location may be transmitted to the local location in which the participant is located.

In Step 335, movement information may be received from the remote location based on the detection of the dance partner's movement.

In step 340, visual feedback may be provided to the participant such as using AR devices, a display, or a similar device. The visual feedback may be a video image of the dance partner or based thereon. The visual feedback may or may not include virtual avatars representing the dance partner and/or the participant. In some exemplary embodiments, the visual feedback may further be based on a video image of the participant.

In Step 345, tactile feedback may be supplied to the participant, for example such as in Step 325. The tactile feedback may simulate effects of movements by the dance partner on the participant.

Steps 300-345 may be performed repeatedly, during which the participant and his dance partner may respond to each other movements using dance gestures and perform a social dance.

In some exemplary embodiments, based on a gesture by participant or based on a command inputted by a different manner, such as using keyboard, pointing device, verbally, or the like, the participant may switch to a different dance partner. In some exemplary embodiments, the visual feedback given to the participant may include plurality of other potential dance partners, which may or may not be engaged in dancing with others.

Figure 3B:
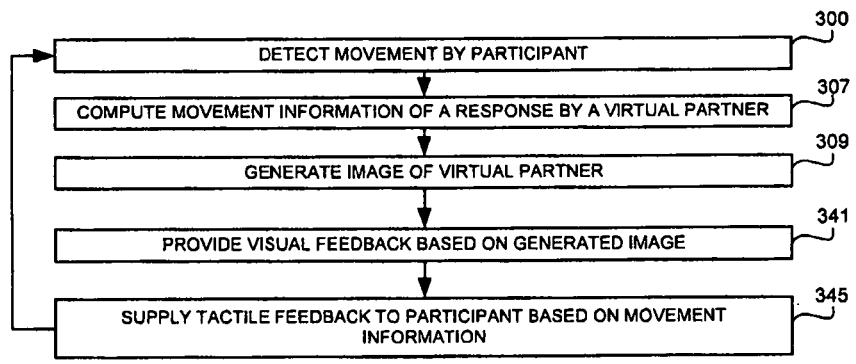
FIG. 3B shows a flowchart of steps in a method for performing a social dance with a virtual partner, in accordance with some exemplary embodiments of the disclosed subject matter.

Referring now to FIG. 3B showing a flowchart of steps in a method for performing a social dance with a virtual partner, in accordance with some exemplary embodiments of the disclosed subject matter. FIG. 3B illustrates a method similar to that of FIG. 3A but instead of dancing with a remote partner, the participant dances with a virtual partner. In some exemplary embodiments, a participant may alternate and switch between dance partners, and optionally between virtual and remote partners as well.

In Step 307, movement of the virtual partner may be computed, such as by a dancing logic module. The movement may be computed to correspond to the participant movement, as detected in Step 200. In some exemplary embodiments, the skill level of the virtual partner may be adjusted to suit that of the participant. In some exemplary embodiments, the movement may be computed based on a given skill and style, such as based on a selection by the participant, automatically adjusted to match the style and skill levels of the participant, or the like.

In Step 309, an image of the virtual partner may be generated.

In Step 341, visual feedback may be provided to the participant. The visual so feedback may be based on the generated image. Additionally or alternatively, the visual feedback may be based on a video capture of the participant himself.

In Step 345, tactile feedback may be supplied to the participant. The tactile feedback may be based on the computed movement information.

Figure 4:
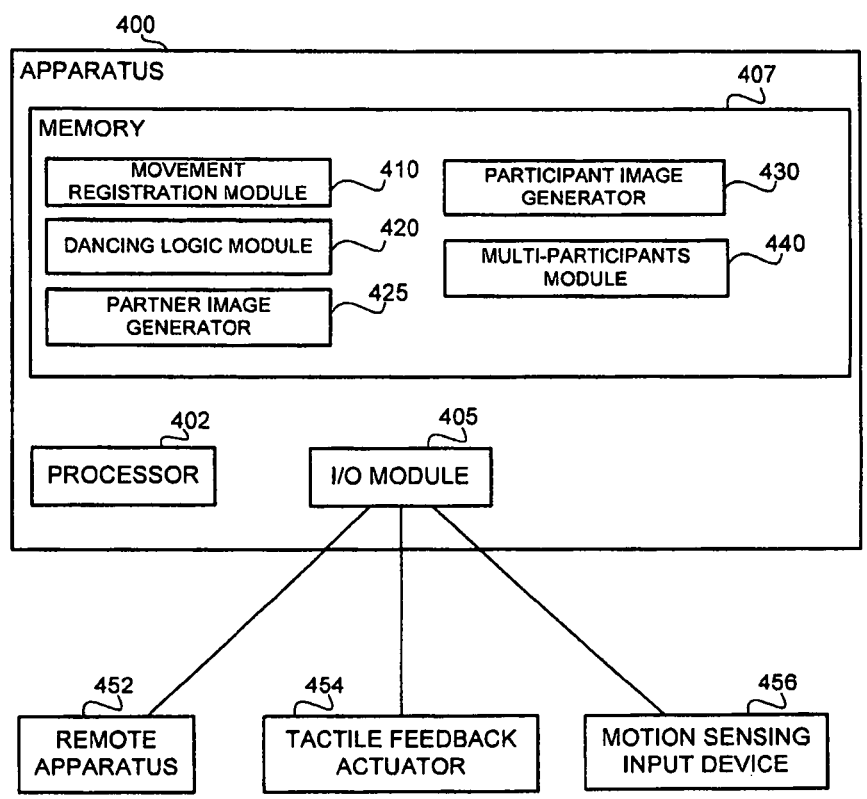
FIG. 4 shows a block diagram of components of a system, in accordance with some exemplary embodiments of the disclosed subject matter.

Referring now to FIG. 4 showing a block diagram of components of a system, in accordance with some exemplary embodiments of the disclosed subject matter.

In some exemplary embodiments, an Apparatus 400 may comprise a Processor 402. Processor 402 may be a Central Processing Unit (CPU), a microprocessor, an electronic circuit, an Integrated Circuit (IC) or the like. Processor 402 may be utilized to perform computations required by Apparatus 300 or any of it subcomponents. Processor 402 may be configured to execute computer-programs useful in performing the method of FIG. 3A, FIG. 3B or the like In some exemplary embodiments of the disclosed subject matter, an Input/Output (I/O) Module 405 may be utilized to provide an output to and receive input from a user, such as Participant 110. I/O Module 405 may be operatively coupled to a Tactile Feedback Actuator 454 used for supplied tactile feedback to the user. I/O Module 405 may be operatively coupled to a display (not shown), AR device (not shown) or a similar device which may be used for providing visual feedback to the user. Additionally or alternatively, audio feedback and/or music may be played and outputted via an audio output device (not shown), such as enabling the user to listen to the music to which he is dancing, hear the dance partner (either real or remote) talk with him, or the like. I/O Module 405 may be operatively coupled to a Motion Sensing Input Device 456 used to monitor movement by the user. I/O Module 305 may further be used to transmit and receive information to and from Remote Apparatus 452, such as located in Remote Location 150. Data transmission may be enabled over a computerized network connecting, either wirelessly or in a wired-manner, between Apparatus 400 and Remote Apparatus 452.

In some exemplary embodiments, Apparatus 400 may comprise a Memory Unit 407. Memory Unit 407 may be a short-term storage device or long-term storage device. Memory Unit 407 may be a persistent storage or volatile storage. Memory Unit 407 may be a disk drive, a Flash disk, a Random Access Memory (RAM), a memory chip, or the like. In some exemplary embodiments, Memory Unit 407 may retain program code operative to cause Processor 402 to perform acts associated with any of the subcomponents of Apparatus 400. In some exemplary embodiments, Memory Unit 407 may retain program code operative to cause Processor 402 to perform acts associated with any of the steps in FIGS. 3A-3B above.

The components detailed below may be implemented as one or more sets of interrelated computer instructions, executed for example by Processor 402 or by another processor. The components may be arranged as one or more executable files, dynamic libraries, static libraries, methods, functions, services, or the like, programmed in any programming language and under any computing environment.

Movement Registration Module 410 may be configured to receive motion sensing information from Motion Sensing Input Device 456 and monitor user's movement. Movement Registration Module 410 may identify movement by the user that relate to a social dance activity, such as dance-related gestures.

Dancing Logic Module 420 may be configured to determine tactile feedback to be supplied to the user. The tactile feedback may be based on movements of a remote partner (e.g., received from Remote Apparatus 452). Additionally or alternatively, the movement may be computed by Dancing Logic Module 420, which calculates movements of a virtual partner. In some exemplary embodiments, the movements of the virtual partner may be in response to movements of the user, which were registered by Movement Registration Module 410.

Partner Image Generator 425 may generate CGI imagery of the dance partner. In some exemplary embodiments, the CGI may be based on a real dance partner, such as by customizing an appearance of a remote partner. Additionally or alternatively, the CGI may be based on a virtual partner. In some exemplary embodiments, the CGI may be generated so as to represent movements of the dance partner, which may be detected in a remote location, determined by Dancing Logic Module 420, or the like.

Participant Image Generator 430 may generate CGI imagery of the participant. The CGI may be based on a video image of the participant or may be automatically determined based on a detected posture of the participant or the like. The CGI may be generated based on user preferences.

It will be noted that in some exemplary embodiments, Remote Appratus 452 may similarly generate CGI's representing the dance partner and the participant. In some exemplary embodiments, the same CGI may be generated in both apparatuses. Additionally or alternatively, based on user configuration, different CGIs may be generated, such as a participant may see a CGI of the dance partner that appears to be a tall blonde dancer, while the dance partner may see herself as a short man. In some exemplary embodiments, one of the users (e.g., the dance partner or the participant) may see himself or herself as captured in video, while the other user may see a CGI image instead.

In some exemplary embodiments, the image of a dancer may be selectively shared with only some of remote participants, thereby addressing privacy issues. The dancer may select which remote participants may be authorized to see him as is, and which participants may see him using one or more avatars. In some exemplary embodiments, the dancer may determine groups of remote participants and for each group determine an avatar to be used to represent him to the members of the group. Additionally or alternatively, a group may be determined to be authorized to see the dancer's video image.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter' scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a movement registration module configured to monitor and identify movements by a participant, wherein the movements are associated with a virtual physical interaction between the participant and a second participant, wherein the second participant is not physically located at a same location of the participant, wherein the movements comprise a pulling action where the participant pulls the second participant; and
a tactile feedback actuator configured to supply tactile feedback to the participant based on a determination by a logic module of a feedback associated with the virtual physical interaction between the participant and the second participant, wherein said logic module is configured to determine response movements of the second participant in response to the movements by the participant based on the movements of the participant, wherein the feedback is determined based on the response movements of the second participant, and induce the feedback via said tactile feedback actuator; and
wherein said tactile feedback actuator is configured to relay feedback commensurate with a virtual physical contact of the second participant with the participant.

2. The system of claim 1, wherein said system is operatively coupled with a second tactile feedback actuator configured to supply tactile feedback to the second participant based on the movements of the participant.

3. The system of claim 2, wherein said system is configured to relay feedback that commensurates with a virtual physical contact of the second participant with the participant and to relay feedback that commensurates with a virtual physical contact of the participant with the second participant.

4. The system of claim 3, wherein said tactile feedback actuator is configured in size and shape to relay feedback commensurate with a virtual physical contact between the hands of the participant and the second participant.

5. The system of claim 1, wherein the movements of the second participant are configured to instruct the participant on a manner of performing a physical action.

6. The system of claim 5, wherein the physical action is a martial art move.

7. The system of claim 1, wherein the movements of the second participant are configured to convey a human physical interaction.

8. The system of claim 7, wherein the human physical interaction is a hug.

9. The system of claim 7, wherein the human physical interaction is a handshake.

10. A method comprising:
monitoring and identifying movements by a participant, wherein the movements are associated with a virtual physical interaction between the participant and a second participant, wherein the second participant is not physically located at a same location of the participant, wherein the movements comprise a pulling action where the participant pulls the second participant;
determining, based on the movements of the participant, response movements of the second participant in response to the movements by the participant; and
supplying tactile feedback to the participant based on a determination of feedback associated with the virtual physical interaction, wherein the tactile feedback is determined based on the response movements of the second participant and commensurate with a virtual physical contact of the second participant with the participant.

11. The method of claim 10, further comprising supplying tactile feedback to the second participant based on the movements of the participant.

12. The method of claim 10, further comprising relaying feedback that commensurates with a virtual physical contact of the second participant with the participant and relaying feedback that commensurates with a virtual physical contact of the participant with the second participant.

13. The method of claim 10, wherein supplying tactile feedback comprises relaying feedback commensurate with a virtual physical contact between the hands of the participant and the second participant.

14. The method of claim 10, wherein the movements of the second participant are configured to instruct the participant on a manner of performing a physical action.

15. The method of claim 10, wherein the movements of the second participant are configured to convey a human physical interaction.

16. The method of claim 15, wherein the human physical interaction is a hug.

17. The system of claim 1, wherein said tactile feedback actuator is configured to supply the tactile feedback by applying seemingly external pulling force on the participant.

18. The system of claim 1, wherein the feedback commensurate with a virtual physical contact of the second participant with the participant is a feedback corresponding in to a force applied in a virtual physical contact of the second participant with the participant, whereby providing different feedbacks to different virtual physical contacts between the second participant and the participant.

19. A system comprising:
a sensor capable of sensing a force applied by a participant's hand, wherein the force applied by the participant's hand is associated with a virtual physical interaction between the participant's hand and a second participant's hand, wherein the second participant is not physically located at a same location of the participant;
a logic module configured to determine a reaction to the force by the second participant's hand; and
a tactile feedback actuator configured to supply tactile feedback to the participant's hand based on the reaction, wherein said tactile feedback actuator is configured to relay feedback commensurate with a virtual physical contact of the second participant with the participant.

* * * * *